United States Patent
Al-Nakhli et al.

(10) Patent No.: US 12,441,925 B2
(45) Date of Patent: Oct. 14, 2025

(54) SELF-DESTRUCTIVE BARITE FILTER CAKE IN WATER-BASED AND OIL-BASED DRILLING FLUIDS

(71) Applicants: SAUDI ARABIAN OIL COMPANY, Dhahran (SA); KING FAHD UNIVERSITY OF PETROLEUM & MINERALS, Dhahran (SA)

(72) Inventors: Ayman R. Al-Nakhli, Dhahran (SA); Mohamed Ahmed Nasr El Din Mahmoud, Dhahran (SA); Zeeshan Tariq, Dhahran (SA)

(73) Assignees: SAUDI ARABIAN OIL COMPANY, Dhahran (SA); KING FAHD UNIVERSITY OF PETROLEUM & MINERALS, Dhahran (SA)

( * ) Notice: Subject to any disclaimer, the term of this patent is extended or adjusted under 35 U.S.C. 154(b) by 0 days.

(21) Appl. No.: 18/639,736

(22) Filed: Apr. 18, 2024

(65) Prior Publication Data

US 2024/0279527 A1  Aug. 22, 2024

Related U.S. Application Data

(63) Continuation of application No. 17/721,061, filed on Apr. 14, 2022, now abandoned.

(51) Int. Cl.
| | |
|---|---|
| *C09K 8/32* | (2006.01) |
| *C09K 8/03* | (2006.01) |
| *C09K 8/84* | (2006.01) |
| *C09K 8/92* | (2006.01) |
| *C09K 23/18* | (2022.01) |

(52) U.S. Cl.
CPC .............. *C09K 8/032* (2013.01); *C09K 8/84* (2013.01); *C09K 8/92* (2013.01); *C09K 23/18* (2022.01)

(58) Field of Classification Search
CPC . C09K 8/032; C09K 8/84; C09K 8/92; C09K 23/18; C09K 2208/12; C09K 2208/18; C09K 8/03; C09K 8/52
See application file for complete search history.

(56) References Cited

U.S. PATENT DOCUMENTS

| | | | | |
|---|---|---|---|---|
| 2012/0165231 A1* | 6/2012 | Miller | ...................... | C09K 8/03 977/734 |
| 2015/0000912 A1* | 1/2015 | Choudhary | ............. | E21B 43/24 166/300 |
| 2015/0021023 A1* | 1/2015 | Roberts | ..................... | C09K 8/92 166/299 |

* cited by examiner

*Primary Examiner* — Kumar R Bhushan
(74) *Attorney, Agent, or Firm* — Osha Bergman Watanabe & Burton LLP (57) ABSTRACT

Drilling fluid compositions may include a weighting agent, a nitrite-containing compound, and an ammonium-containing compound, where the nitrite-containing compound and the ammonium-containing compound may be encapsulated together in copolymer micro-particles forming encapsulated thermochemical compounds, and where at least one property selected from the group consisting of the density, the plastic viscosity, the yield point, the gel strength, and the pH, of the drilling fluid composition may be substantially similar to the at least one property of a comparable drilling fluid composition devoid of the encapsulated thermochemical compounds. Methods for reducing a filter cake from a wellbore surface in a subterranean formation are also provided. The methods may include introducing into the wellbore the drilling fluid compositions, allowing the drilling fluid composition to reach a temperature in the wellbore sufficient for the encapsulated thermochemical compounds to react, where the reaction of the encapsulated thermochemical compounds generates heat and nitrogen gas.

12 Claims, 10 Drawing Sheets

SELF-DESTRUCTIVE BARITE FILTER CAKE IN WATER-BASED AND OIL-BASED DRILLING FLUIDS

This Application is a Continuation of application Ser. No. 17/721,061 filed on Apr. 14, 2022. The entire contents of these applications are incorporated herein by reference in their entirety.

BACKGROUND

Drilling fluids are used to help drill wellbores into earth formations. Liquid drilling fluids may be water-based or oil-based. Drilling fluids may be used to cool the drilling equipment, reduce friction between the drill bit and the wellbore surface, control the formation pressure, seal permeable formations, and maintain wellbore stability. When drilling wellbores into permeable formations, oil-based or water-based drilling fluids may create a hydrostatic pressure, preventing fluids in the formations from penetrating the wellbore.

Drilling fluids may include a weighting material that forms a layer of residue or solid particles called "filter cake" or "mud cake". This cake lines the surface of permeable wellbore zones to prevent both fluids from the formation from leaking into the wellbore and drilling fluid filtrate from penetrating into the formation.

Weighting materials are generally the main solid constituent of drilling fluids. Barite is often used to increase the weight and hydrostatic pressure of both oil-based and water-based drilling fluids. In operations using these types of drilling fluid, the resulting filter cake is mainly composed of barite particles. Such filter cake is impermeable and highly insoluble in both water and acidic solutions, such as solutions of acetic acid, hydrochloric acid, and formic acid. As such, the cake controls drilling fluid loss and mitigates solids invasion in the formation, both of which may contribute to formation damage.

SUMMARY

Certain embodiments of the disclosure will be described with reference to the accompanying Drawings, where like reference numerals denote like elements. It should be understood, however, that the accompanying figures illustrate the various implementations described and are not meant to limit the scope of various technologies described.

In some embodiments, drilling fluid compositions are provided. The drilling fluid compositions may include a weighting agent, a nitrite-containing compound, and an ammonium-containing compound. The nitrite-containing compound and the ammonium-containing compound may be encapsulated together in copolymer micro-particles forming encapsulated thermochemical compounds. At least one property selected from the group consisting of the density, the plastic viscosity, the yield point, the gel strength, and the pH of the drilling fluid composition may be substantially similar to the at least one property of a comparable drilling fluid composition devoid of the encapsulated thermochemical compounds.

In some embodiments, methods are provided for reducing a filter cake from a wellbore surface in a subterranean formation. The methods may include introducing into the wellbore a drilling fluid composition comprising a weighting agent, a nitrite-containing compound, and an ammonium-containing compound, where nitrite-containing compound and the ammonium-containing compound are encapsulated together in copolymer micro-particles forming encapsulated thermochemical compounds. In addition, the methods may include allowing the drilling fluid composition to reach a temperature in the wellbore sufficient for the encapsulated thermochemical compounds to react, where the reaction of the encapsulated thermochemical compounds generates heat and nitrogen gas. Further, in the methods at least a portion of the formed filter cake is removed using the heat and nitrogen gas released from the reaction of the thermochemical compounds.

Other aspects and advantages of this disclosure will be apparent from the following Detailed Description made with reference to the accompanying Drawings and the appended Claims.

DETAILED DESCRIPTION

The formation of filter cake on the face of a permeable formation depends on several parameters of drilling fluids, such as weightage of solid particles, composition, rheology, additives, differential pressure, and formation mineralogy. In addition, filter cake properties, such as thickness, toughness, slickness, and permeability may affect the reservoir productivity. Filter cake formed on the surface of permeable wellbore zones may reduce reservoir productivity by blocking the production of oil and gas from permeable formations into the wellbore. Further, when cementing operations are undertaken to seal lost circulation zones, the presence of filter cake may cause the debonding of cement between the casing and the formation. Therefore, the removal of filter cake during or after drilling operations is desirable.

Examples of materials that may be used to remove filter cake include acids and enzymes. However, the simultaneous removal of filter cake and inhibition of formation damage in formations, such as carbonate formations, with acids is expensive and challenging. This is especially true in horizontal wells because of both the fast reaction of the acid and the difficulty of placing the acid at an appropriate location in horizontal sections. Further, enzymes have been shown to partially degrade in the presence of acids and oxidizers. Accordingly, there exists a need for improved filter cake removal treatments to reduce or eliminate filter cake formed from the use of barite weighting agent in drilling fluids.

Generally, embodiments disclosed relate to drilling fluid compositions and methods for reducing the amount of or eliminating filter cake resulting from the use of treatment additives, such as weighting agents, in these drilling fluids. The one or more embodiments relate to both oil-based and water-based drilling fluid compositions that include encapsulated thermochemical compounds that reduce or eliminate the filter cake.

One or more embodiments relate to drilling fluid compositions and methods that remove filter cake from the surface of permeable wellbore zones. The methods provide useful conditions for filter cake removal treatments to be effective. The compositions include a weighting agent, such as barite, and encapsulated thermochemicals.

Barite is barium sulfate ($BaSO_4$). Barite increases the hydrostatic pressure of drilling fluids, which compensates for high-pressure zones during drilling to prevent fluid influx or even a blowout. Barite is also used as lubricant, preventing the damage of drilling tools during drilling. In the formulations according to some embodiments, barium sulfate is in the form of particles having a size in a range of about 40 microns to about 60 microns.

As used, the term "thermochemicals" may also be referred to as "thermochemical compounds" or "thermochemical reactants," and may include chemicals that exothermically react to produce heat and pressure. Thermochemicals may be provided in a fluid solution (for example, a diluted or concentrated solution containing one or more types of thermochemicals), a suspension, or in a dry form (for example, a powder). In one or more embodiments, thermochemical compounds may include, but are not limited to, urea, sodium hypochlorite, ammonium-containing compounds, or nitrite-containing compounds. Examples of ammonium-containing compounds include ammonium chloride, ammonium bromide, ammonium nitrate, ammonium sulfate, ammonium carbonate, and ammonium hydroxide. Examples of nitrite-containing compounds include sodium nitrite and potassium nitrite.

In one or more embodiments, thermochemical compounds may include both ammonium-containing compounds and nitrite-containing compounds to act as the encapsulated thermochemicals. For example, the ammonium-containing compound may be ammonium chloride or ammonium sulfate; the nitrite-containing compound may be sodium nitrite. The thermochemical reactions of ammonium chloride and sodium nitrite are represented by Equations (1) and (2), respectively:

According to the thermochemical reactions of Equations (1) and (2), the thermochemical compounds generate "thermolabile" intermediate products, which are immediately transformed into sodium chloride or sodium sulfate (salts), nitrogen (gas), and steam (water+heat). The release of nitrogen gas and steam generates high pressure conditions. The use of ammonium sulfate generates more pressure than the use of ammonium chloride in thermochemical reactions under the same conditions.

Two types of energy—kinetic energy and thermal energy—are associated with the reactions of the thermochemical compounds of the drilling fluid compositions and corresponding methods. For example, in the reaction illustrated by Equation (1), ammonium chloride and sodium nitrite solutions are mixed in the presence of heat (for example, ≥150° F.) to generate $N_2$ gas and heat. The pressure generated in the case of ammonium chloride is about 1000 psi; about 2000 psi in the case of ammonium sulfate.

Figure 1:
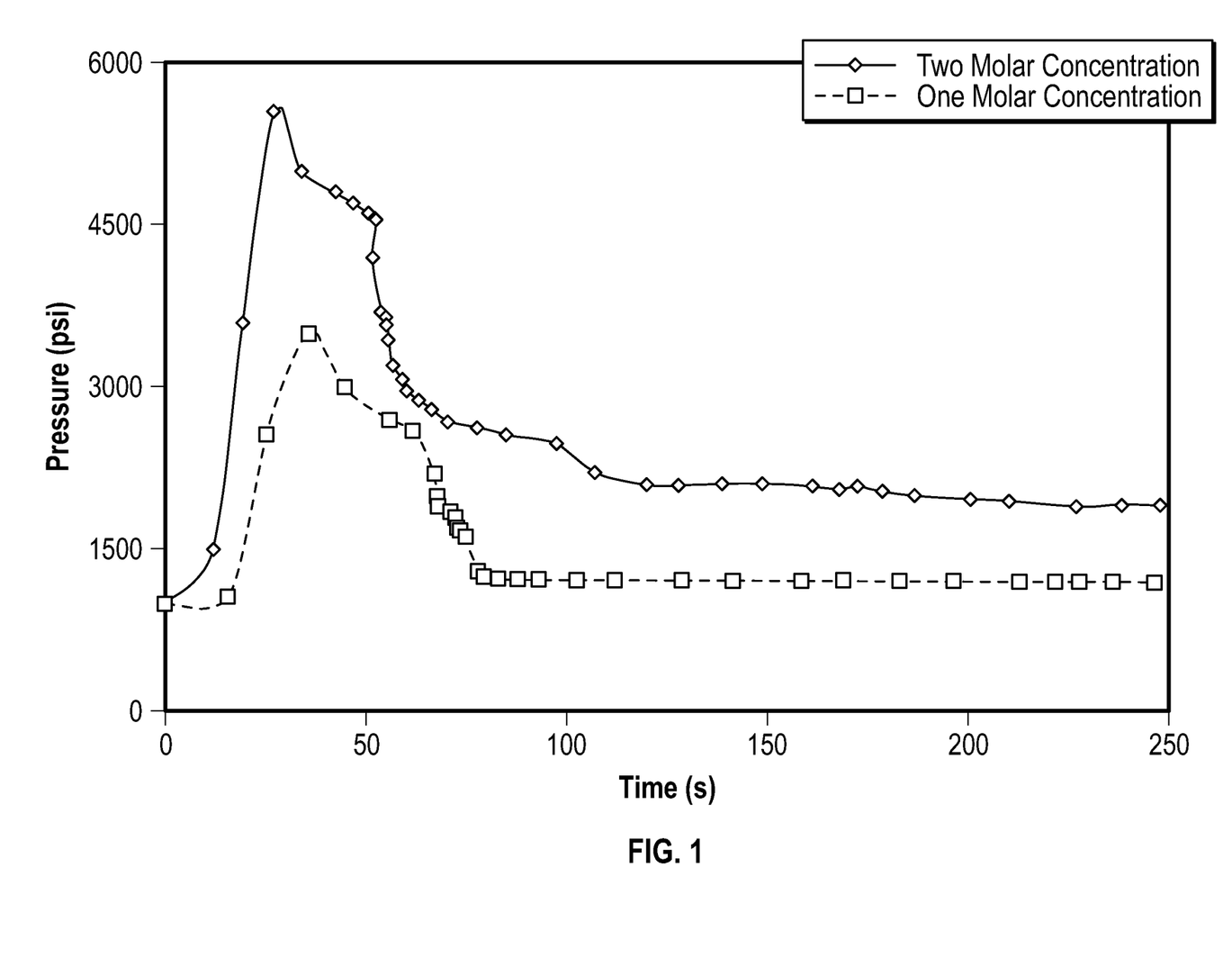
FIG. 1 is graph showing the effect of molar concentration of thermochemical reactants on pressure pulse generation according to one or more embodiments.
Figure 2:
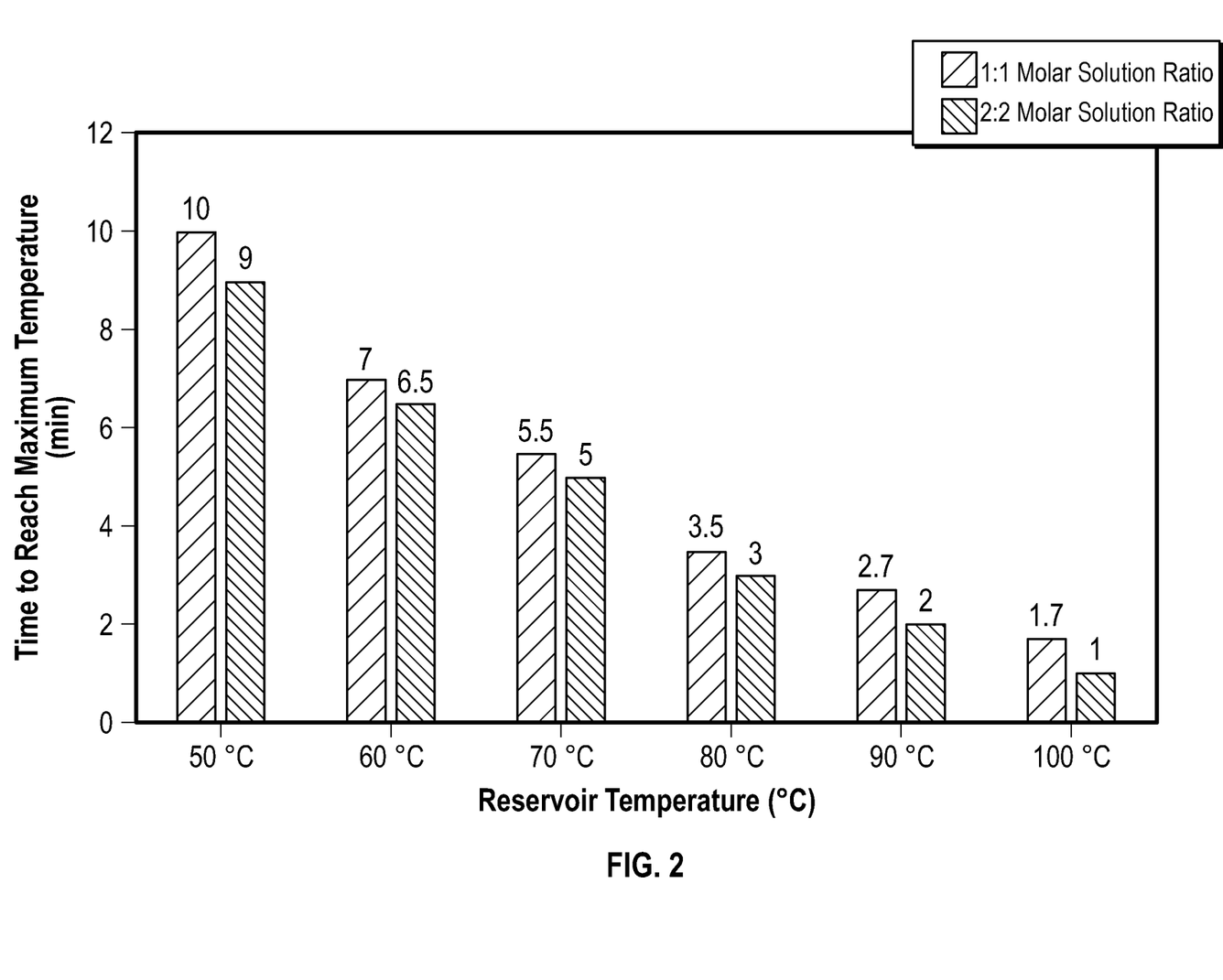
FIG. 2 is a bar graph showing the time required for thermochemical reactants at different molar ratios to reach maximum temperature in various reservoir temperatures according to one or more embodiments.

The concentration of thermochemical reactants may be in a range of from about 0.5 to about 10 molar (M), such as from about 1 to about 5 M, such as from about 1 to about 2 M. Greater concentrations generate increased high-pressure conditions, as illustrated in FIG. 1 where there is a mole ratio of 1:1. The molar solution ratio of the thermochemical compounds may vary, such as 1:1 or 2:2 for the molar solution ratio of ammonium chloride to sodium nitrite. Greater molar ratios may lead to a reduced amount of time to reach maximum temperature, as shown in FIG. 2.

In the drilling fluid compositions and methods to remove filter cake from the surface of permeable wellbore zones, the nitrite-containing compound and the ammonium-containing compound may be encapsulated together in copolymer micro-particles, forming encapsulated thermochemical compounds.

The copolymer micro-particles encapsulate may include delayed release copolymers of esters or carbonic acid. Other delayed release copolymers may include derivatives of formic acid, lactic acid, methyl lactate, ethyl lactate, propyl lactate, and butyl lactate. Other delayed release copolymers may include polyesters of glycerol, tripropionin (a triester of propionic acid and glycerol), trilactin, and esters of acetic acid and glycerol, such as monoacetin, diacetin, and triacetin. Other delayed release copolymers may include ethylene glycol monoformate, ethylene glycol diformate, diethylene glycol diformate, glyceryl monoformate, glyceryl diformate, glyceryl triformate, triethylene glycol diformate and formate esters of pentaerythritol. In one or more embodiments, the delayed release copolymer micro-particles may include aliphatic polyesters, poly(lactides), poly(glycolides), poly(caprolactones), poly(hydroxy ester ethers), poly(hydroxybutyrates), poly(anhydrides), aliphatic polycarbonates, poly(orthoesters), poly(amino acids), poly(ethylene oxides), and polyphosphazenes.

In one or more embodiments, the copolymer micro-particles encapsulating the thermochemical compounds may have a size in a range of from about 25 to about 50 microns.

Figure 4:
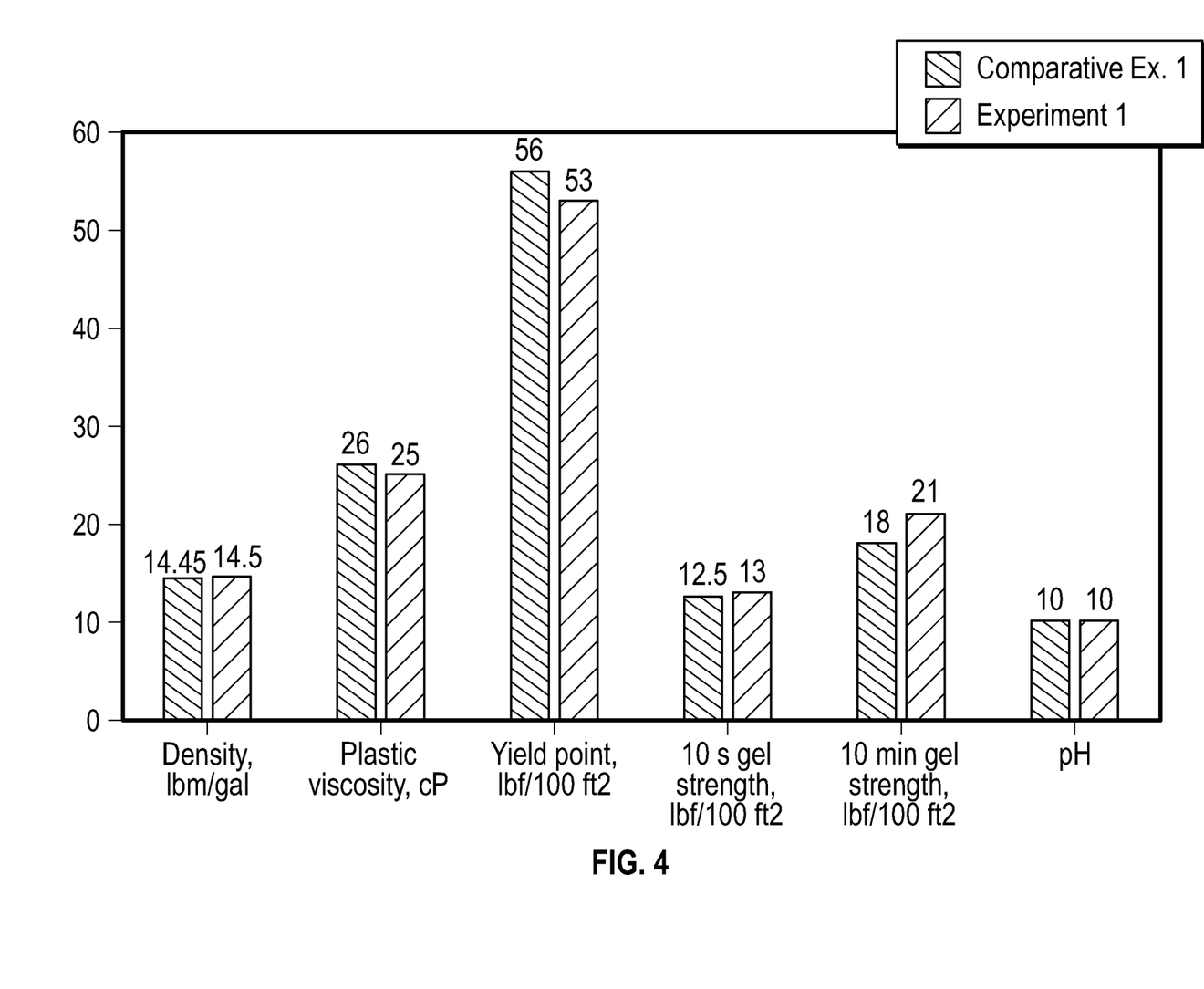
FIG. 4 is a bar graph showing the density, plastic viscosity, yield point, 10 second (sec) gel strength, 10 minute (min) gel strength, and pH for Comparative Example 1 and Experiment 1 according to one or more embodiments.
Figure 5:
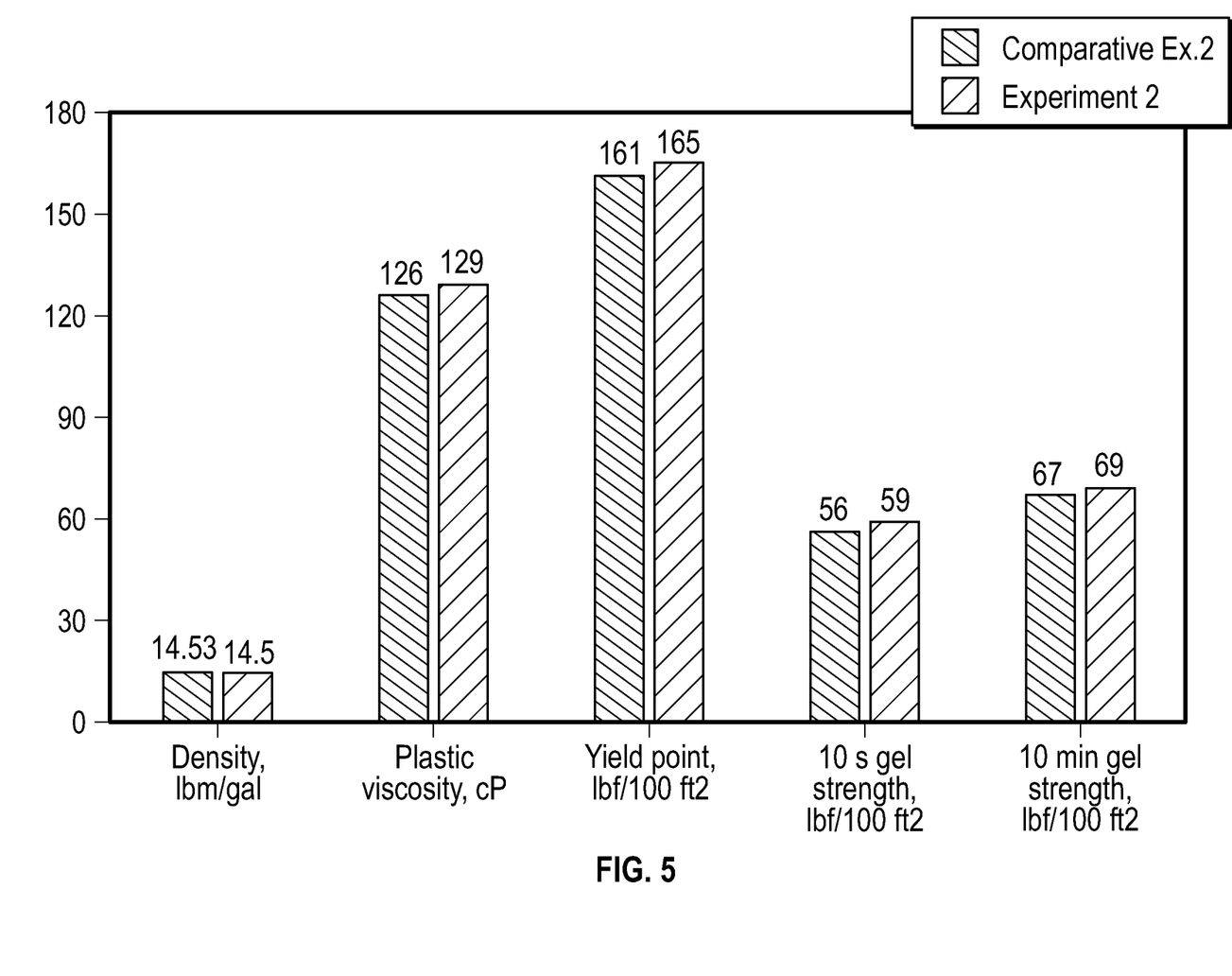
FIG. 5 is a bar graph showing the density, plastic viscosity, yield point, 10 sec gel strength, 10 min gel strength, and pH for Experiment 2 and Comparative Example 2 according to one or more embodiments.

In the drilling fluid compositions and methods to remove filter cake from the surface of permeable wellbore zones, the properties of the drilling fluid composition are substantially similar to the corresponding property of a comparable drilling fluid composition devoid of encapsulated thermochemical compounds. In particular, physio-chemical properties, including the density, the plastic viscosity, the yield point, the gel strength, and the pH of the drilling fluid composition containing a nitrite-containing compound and an ammonium-containing compound encapsulated together in copolymer micro-particles are substantially similar to the corresponding properties of the similar drilling fluid composition not containing encapsulated thermochemical compounds as illustrated in FIGS. 4 and 5.

The drilling fluid compositions according to one or more embodiments are water- or oil-based, such as diesel, and may include emulsions having both water and oil. Further, the drilling fluid compositions may include one or more additives, such as a rheology modifier, a pH-adjuster, a clay stabilizer, a bridging agent, a fluid loss control agent, and an emulsifier.

More particularly, the drilling fluid compositions may include *Xanthomonas campestris* (XC) polymer (xanthan gum). Xanthan gum may be added to improve the cutting transportation and rheology of the drilling fluids, or to avoid filtrate loss. Xanthan gum is a polysaccharide discharged by the bacteria called *Xanthomonas campestris*. Chemically, Xanthum gum includes the calcium, potassium, and sodium salt of a higher molecular weight polysaccharide. These polysaccharides contain d-glucuronic, d-glucose, and d-mannose acid. Xanthan gum is completely soluble in water and in solid form has a color of cream powder. Xanthan gum contains at least 1.5% (by weight) pyruvic acid.

The drilling fluid compositions may include caustic soda as a pH-adjuster to maintain the pH of the drilling fluid. The drilling fluid compositions may also include sodium chloride as a clay stabilization additive. The drilling fluid compositions may also include starch, for example, hydroxypropyl starch, which is a derivative of natural starch, to avoid fluid loss. The starch may be nonionic and may only be affected by hardness and salinity of the fluids. The drilling fluid compositions may also include calcium carbonate ($CaCO_3$) with two different micron-sized particles as a bridging agent. The drilling fluid compositions may also include calcium chloride as a clay stabilization additive. When present, these components are in a range of from about 0.01 to about 5 wt % (weight percent), such as from 0.5 to 3 wt %, such as from 0.8 to 2 wt % relative to a total weight of the drilling fluid composition.

The method for reducing a filter cake from a wellbore surface in a subterranean formation according to one or more embodiment may include introducing into the wellbore the drilling fluid composition having a weighting agent and encapsulated thermochemicals. The thermochemicals may include a nitrite-containing compound and an ammonium-containing compound that are encapsulated together in copolymer micro-particles. As a result, the drilling fluid composition may be in contact with the wellbore surface and a filter cake may be formed on the surface of the wellbore.

The method may include maintaining the drilling fluid composition in the wellbore such that the drilling fluid composition reaches a temperature sufficient for the encapsulated thermochemicals to react, where the reaction of the encapsulated thermochemicals generates heat and nitrogen gas. As a result, at least a portion of the formed filter cake may be removed using the heat and nitrogen gas released from the reaction of the thermochemicals. The method may further include forming the drilling fluid composition before introducing the drilling fluid composition into the wellbore. The method may further include cementing the wellbore after the step of removing at least a portion of the formed filer cake. The method may further include producing hydrocarbons after the step of removing at least a portion of the formed filer cake.

Using the method according to one or more embodiments, at least 70 vol % (volume percent), or at least 75 vol %, or at least 80 vol %, or at least 85 vol % of a filter cake formed on the surface of a formation face may be removed. The method may also provide for the removal of in a range of from about 70 vol % to about 99 vol % of the filter cake formed on the surface on a formation face, or from about 71 vol % to about 99 vol %, or from about 72 vol % to about 98 vol %, or from about 73 vol % to about 97 vol %, or from about 74 vol % to about 96 vol %, or from about 75 vol % to about 95 vol %, or from about 76 vol % to about 94 vol %, or from about 77 vol % to about 93 vol %, or from about 78 vol % to about 92 vol %, or from about 79 vol % to about 91 vol %, or from about 80 vol % to about 90 vol %, or from about 85 vol % to about 90 vol %.

Using the encapsulated thermochemicals may generate heat and high pressure through exothermic reactions within the wellbore once the encapsulated thermochemicals reach a certain temperature and once the encapsulating copolymer micro-particles are decomposed. In one or more embodiment methods, the encapsulated thermochemicals are part of the drilling fluid pumped into the wellbore. The system may be controlled by using specific copolymer micro-particles sizes and thicknesses. The encapsulation can be uniformly sized microporous tubular membrane with an average micropore diameter in the range of from about 0.1 to about 30 µm, or from about 0.5 to about 25 µm, or from about 1 to about 20 µm, or from about 5 to about 10 µm.

In addition, the encapsulated thermochemicals start a thermochemical reaction when they reach a certain temperature within the wellbore. This activating temperature may depend on the type of thermochemicals being used, and may be, for example, greater than about 25° C., greater than about 50° C., or greater than about 70° C. Therefore, the start of the thermochemical reaction may depend on temperature within the wellbore. Additionally, the start of the thermochemical reaction may depend on other wellbore conditions, such as pH and pressure. The thermochemical reaction releases kinetic and thermal energy, which helps remove the filter cake that is deposited on the face of the formation when the drilling fluid is added. Therefore, the method results in the self-destruction of filter cake that is formed from the barite contained in the drilling fluid and removed by the thermochemical reaction of the thermochemical compounds contained in the same drilling fluid.

EXAMPLES

The following examples are merely illustrative and should not be interpreted as limiting the scope of the present disclosure.

Example 1—Reaction Kinetics

The reaction kinetics of the thermochemical reaction of Equation (1) were investigated.

$$NH_4Cl + NaNO_2 \rightarrow \begin{bmatrix} NH_4NO_2 + NaCl.NH_4NO_2 \\ \text{Themolabile} \end{bmatrix} \rightarrow \qquad (1)$$

-continued $$NaCl + 2H_2O + N_2(gas) + \Delta H(heat)$$

The reaction parameters, such as enthalpy change, thermal conductivity, and specific heat capacity, were determined. These parameters, which were determined to produce the thermal energy required to dissolve filter cake formed with water and oil-based drilling fluids, are listed in Table 1. Enthalpy change is in kJ/mol is Kilojoules per mole, thermal conductivity is in Watts per mole-Kelvin, and specific heat capacity is in Joules per mole-Kelvin.

TABLE 1

Reaction parameters obtained from the thermochemical reaction $NH_4Cl$ and $NaNO_2$ in one molar concentration

| Reaction Parameters | Values | Units |
|---|---|---|
| Enthalpy change ($\Delta H$) | 369 | kJ/mol |
| Thermal conductivity ($\lambda$) | 0.1-0.6 | W/m · K |
| Specific heat capacity (C) | 85-110 | J/mol · K |

The thermochemical reaction of Equation (1) generated a temperature of up to 371° C. and pressure up to 3500 psi (pounds per square inch). The pressure pulse generation profiles were also determined for one molar and two molar solution ratio concentrations of the thermochemical reactants. The thermochemical reactions were initiated by preheating a cell to 100° C. The generated pressure pulses from the release of nitrogen gas were logged in an aging cell with a capacity of 20 cc (cubic centimeters). The corresponding pressure pulse generation profiles are illustrated in FIG. 1. FIG. 1 shows that increasing the molar concentration of the thermochemical reactants enhanced the pressure generation.

Figure 3:
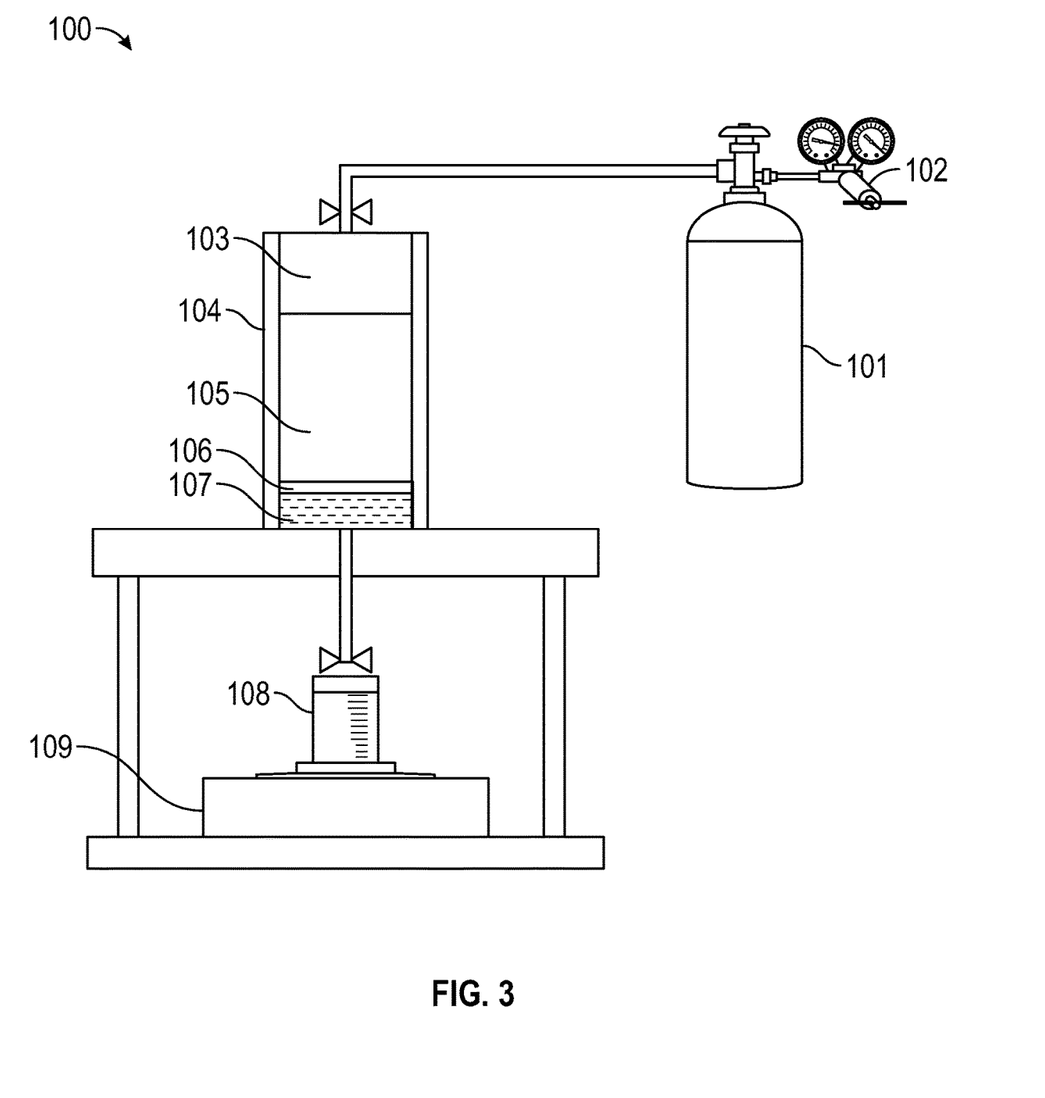
FIG. 3 is a schematic illustration of the high-pressure/high-temperature (HPHT) static filter press apparatus used in testing Experiments 1 and 2 and Comparative Examples 1 and 2 according to one or more embodiments.

The thermochemical reaction was studied under batch system in an insulated micro-reactor. The schematic of the set-up is shown in FIG. 3. It consists of a high temperature/high-pressure (HTHP) micro-reactor, nitrogen gas cylinder, heater, and sensors (for temperature and pressure measurement) coupled with a computer processor. Certain volumes of equimolar concentrations of the reactants (ammonium chloride and sodium nitrite) were fed into the reactor. The reaction was performed at different reactor temperatures (50, 60, 70, 80, 90, 100° C.: typical of representative reservoir temperatures) with the reactants (pH=5.8, molarity (M)=1). The progress was monitored by collecting data for increase in temperature and pressure at equal time intervals through the data logging system. The nitrogen gas generated during the reactions produced the pressure increase of the system. The pressure generated in the system was logged and reported.

In addition, FIG. 2 shows the sensitivity of the initial wellbore temperature on the reaction time. FIG. 2 shows test results for varying initial wellbore temperatures from 50° C. to 100° C. using one molar and two molar concentrations ratios of the thermochemical reactants of Equation (1). As shown in FIG. 2, the reaction time of thermochemical fluids strongly correlates with the initial wellbore temperature.

Example 2—Water-Based and Oil-Based Drilling Fluid Formulations with and without Thermochemicals Examples of water-based and oil-based drilling fluid compositions were prepared according to the formulations shown in Tables 2 and 3, respectively. An emulsion-based microencapsulation technique was used for encapsulation. Removal precursors were developed by encapsulating the formulation in polymeric shells that decomposes at a controlled time at a specific temperature to remove the barite filter cake. This can be done for oil and water-based drilling fluids. The encapsulation process was achieved using membrane technology. With this technology, a high degree of capsule-size uniformity could be obtained with low energy input and reduced material consumption.

Table 2 shows water-based drilling fluid formulations with (Experiment 1) and without (Comparative Example 1) encapsulated thermochemicals. Distilled water was used as a base fluid in both formulations. Comparative Example 1 represents a conventional water-based drilling fluid system commonly used in the industry. Experiment 1 included the two types of encapsulated thermochemical fluids. In both formulations, barite particles were the main constituent of the drilling fluid system. Barite particles weighing 278 g (grams) out of total solids weight (552 to 566) g comprising a weightage of 50% of the total solids. Xanthan gum was added to both formulations to improve the cutting transportation rheology of the drilling fluids, and to avoid filtrate loss. Caustic soda was added in both formulations of water-based drilling fluids to maintain the pH of the drilling fluid. Calcium carbonate ($CaCO_3$) with two different micron-sized particles was used as a bridging agent. Sodium chloride (NaCl) was used as a clay stabilization additive. Hydroxypropyl starch, which is a derivative of natural starch, was added in both formulations of the drilling fluid system to avoid fluid loss. The starch is nonionic and can only be affected by hardness and salinity of the fluids. In Experiment 1 of the water-based drilling fluid, the amounts of encapsulated thermochemical fluids TCFA ($NH_4Cl+NaNO_2$) and TCFB ($NH_4Cl+NaNO_2$ at twice the molar solution ratio of TCFA), added were 8.5 g and 5.5 g, respectively. The encapsulated size of the pills was in between 25 to 50 microns.

TABLE 2

Water-based drilling fluid formulations

| Components | Chemical Formula | Experiment 1 | Comparative Example 1 | Units |
|---|---|---|---|---|
| Distilled Water | $H_2O$ | 241.5 | 241.5 | $cm^3$ |
| Xanthomonas Campestris (XC) Polymer (xanthan gum) | | 1 | 1 | G |
| Caustic Soda | NaOH | 0.25 | 0.25 | g |
| Sodium Chloride | NaCl | 22 | 22 | g |
| Starch (hydroxypropyl) | $C_6H_5O_{10}$ | 4 | 4 | g |
| Calcium Carbonate CaCO3 (25 micron) | $CaCO_3$ | 3 | 3 | G |
| Calcium Carbonate CaCO3 (38 micron) | $CaCO_3$ | 3 | 3 | G |
| Barite (60 micron) | $BaSO_4$ | 278 | 278 | G |
| Encapsulated TCFA (25 to 50 micron) | $NH_4Cl + NaNO_2$ | 5.5 | 0 | G |
| Encapsulated TCFB (25 to 50 micron) | $NH_4Cl + NaNO_2$ | 8.5 | 0 | G |

Two oil-based drilling fluid Experiment 2 and Comparative Example 2 are also prepared and are shown in Table 3. In these oil-based drilling fluid formulations, diesel was used as base fluid. An emulsifier was added in both formulations of oil-based drilling fluids to reduce the interfacial tension between oil and water. Gemini type surfactants were used as emulsifiers. This ensured the formation of stable and small water droplets. Calcium chloride ($CaCl_2$)) was used as a clay stabilization additive in both formulations of oil-based drilling fluids. In Experiment 2, the amounts of encapsulated thermochemical fluids TCFA and TCFB added were 8.5 g and 5.5 g, respectively. The encapsulated size of the pills was between 25 to 50 microns.

TABLE 3

Oil-based drilling fluids formulations

| Components | Chemical Formula | Experiment 2 | Comparative Example 2 | Unit |
|---|---|---|---|---|
| Diesel | | 172 | 172 | cm³ |
| Emulsifier | | 11 | 11 | G |
| Water | H₂O | 50 | 50 | cm³ |
| Calcium chloride | CaCl2 | 32 | 32 | g |
| Barite (40-60 micron) | BaSO₄ | 300 | 300 | g |
| Encapsulated TCFA (25 to 50 micron) | NH₄Cl + NaNO₂ | 5.5 | 0 | g |
| Encapsulated TCFB (25 to 50 micron) | NH₄Cl + NaNO₂ | 8.5 | 0 | g |

Example 3—HPHT Filter Press Experiments

To create and remove the filter cake using water-based and oil-based drilling fluid compositions according to the examples, a high-temperature/high-pressure (HPHT) static filter press apparatus was used. FIG. 3 is a schematic representation of the HPHT static filter system 100 that was used in the Examples. The HPHT static filter system 100 has a canister 101 containing compressed nitrogen gas and a regulator 102. In the HPHT static filter system 100, the nitrogen gas 103 is pushed in the heating jacket 104 containing the drilling fluid 105 and formed filter cake 106 over a rock sample 107. The drilling fluid filtrate 108 is weighed using balance 109.

The tests were conducted at the pressure differential of 200 psi and ambient temperature. To create and remove the filter cake using old and new formulations, the HPHT API static (American Petroleum Institute) filter press apparatus was used. All the tests were carried out at the pressure difference of 200 psi and ambient temperature. The API filter press is shown in FIG. 3. The filter cake was formed on a ceramic disk. The diameter of the ceramic disk was 25 mm (milimeters). The thickness of the ceramic disk was 1.3 mm. Four different experiments were performed using the oil and water-based drilling fluids Comparative Examples 1-2 and Examples 1-2. The formed filter cake was placed in an HPHT cell and heated up to 100° C. for 48 hours as a soaking time. A differential pressure of 200 psi was applied. The weight of the filter cake before and after the treatment was recorded.

Example 4—Rheological Properties of Drilling Fluids

The basic drilling fluid properties of the drilling fluid of Comparative Examples 1-2 and Experiments 1-2 mud are shown in FIGS. 4 and 5. Basic drilling fluid properties measured were density, plastic viscosity, yield point, 10 sec gel strength, 10 min gel strength, and pH. As illustrated in FIGS. 4 and 5, it can be observed that basic drilling fluid properties were not affected by the presence of encapsulated thermochemicals in the drilling fluids. As such, these encapsulated thermochemicals can be considered compatible with the drilling fluid ingredients.

Example 5—Static Filtration Experiments

API static filtration experiments (API RP 13B-1, 5th Edition, May 2019—Recommended Practice for Field Testing Water-based Drilling Fluids) were conducted using a Fann filter press apparatus for the formulations of oil-based and water-based drilling fluids.

Figure 6:
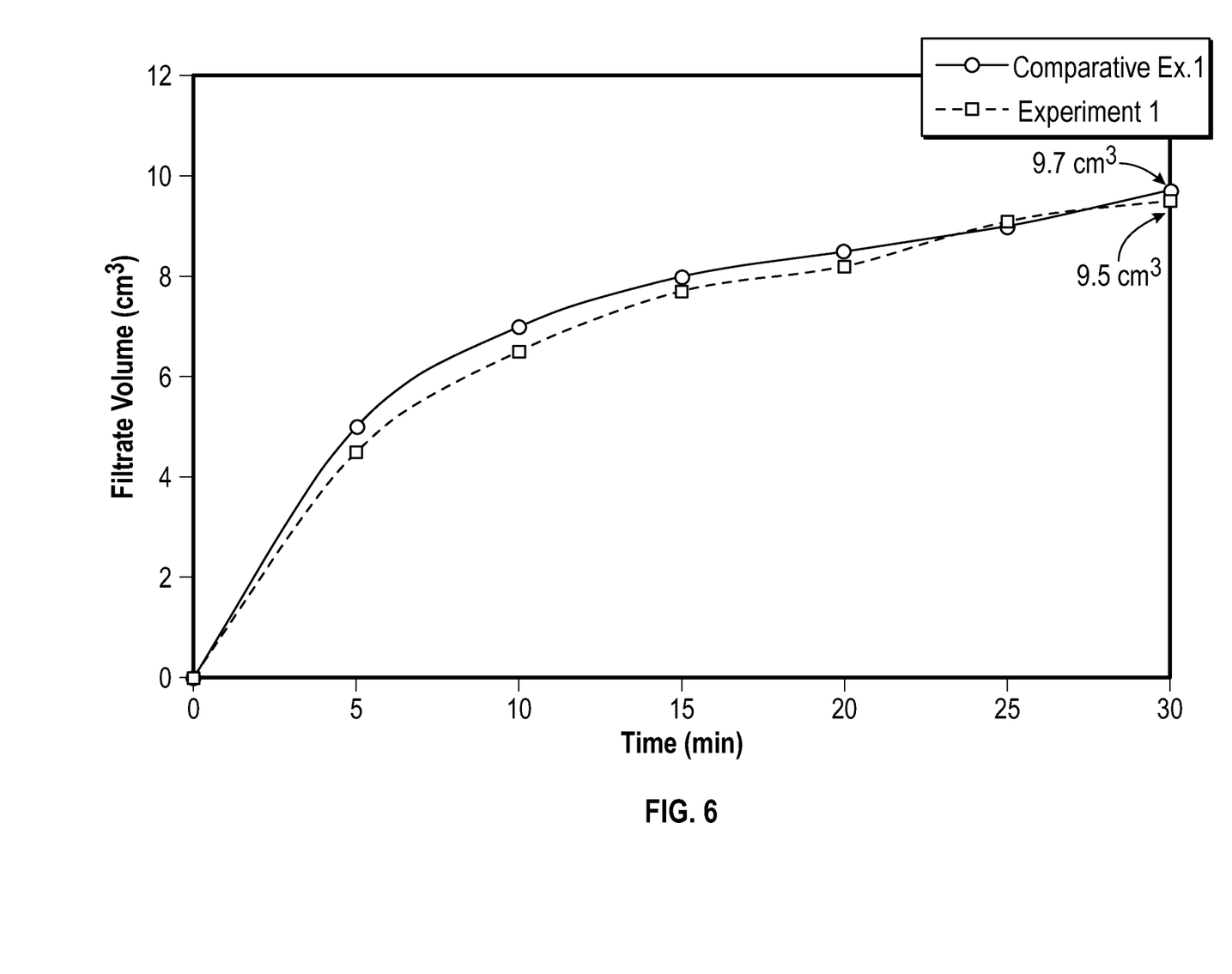
FIG. 6 is a graph showing the filtrate volume in function of time illustrating the filtration performances of the drilling fluids of Experiment 1 and Comparative Example 1 according to one or more embodiments.

FIG. 6 shows the filtration performances of the formulations of Experiment 1 and Comparative Example 1 on a ceramic disk. The results shown in FIG. 6 are of standard test time of 30 minutes. The water-based drilling fluid of Comparative Example 1 yielded a total filtrate volume of 9.7 cm³ (cubic centimeters). The filter cake formed on a ceramic disc had a thickness of 1.3 mm. The water-based drilling fluid of Experiment 1 yielded a filtrate volume of 9.5 cm³ after 30 minutes of the test. The filter cake formed on a ceramic disk had a thickness of 1.2 mm.

Figure 7:
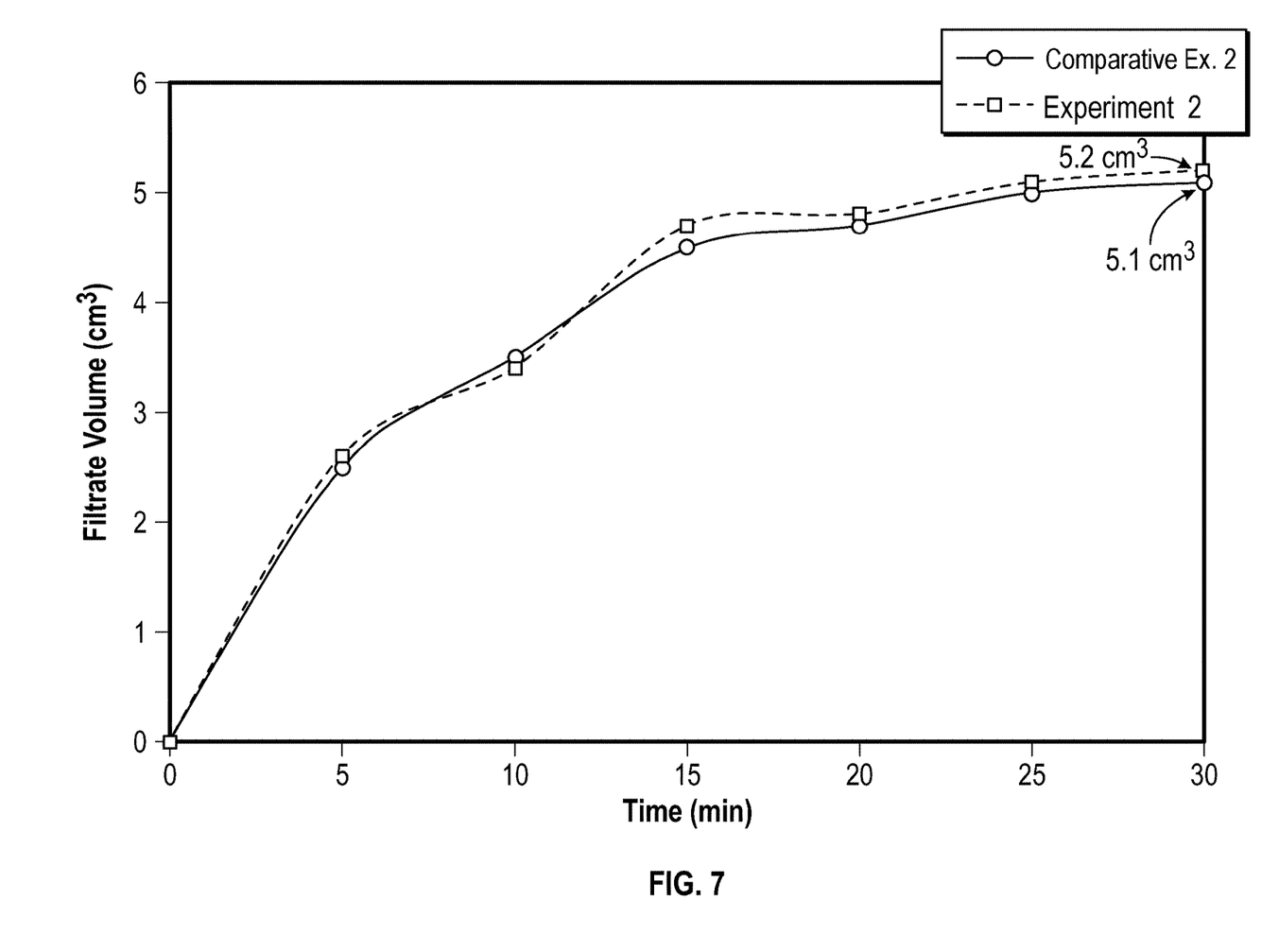
FIG. 7 is a bar graph showing the filtrate volume in function of time illustrating the filtration performances of the drilling fluids of Experiments 2 and Comparative Example 2 according to one or more embodiments.

FIG. 7 shows the filtration performances of oil-based drilling fluids of Experiment 2 and Comparative Example 2. Comparative Example 2 resulted in the filtrate loss of 5.1 cm³, while Experiment 2 resulted in the filtrate loss of 5.2 cm³.

The filtration of water-based and oil-based drilling fluid formulations with encapsulated thermochemicals (Experiments 1 and 2) was almost identical with that of water- and oil-based drilling fluid formulations without encapsulated thermochemicals (Comparative Examples 1 and 2), respectively. The filtration of water-based and oil-based drilling fluid formulations with encapsulated thermochemicals was almost identical with that of water- and oil-based drilling fluid formulations without encapsulated thermochemicals. The ratio used in the Examples can be optimized based on the formation rock pore throat distribution. The thermochemicals capsule size should be comparable with the formation rock pore throat size distribution.

Figure 8:
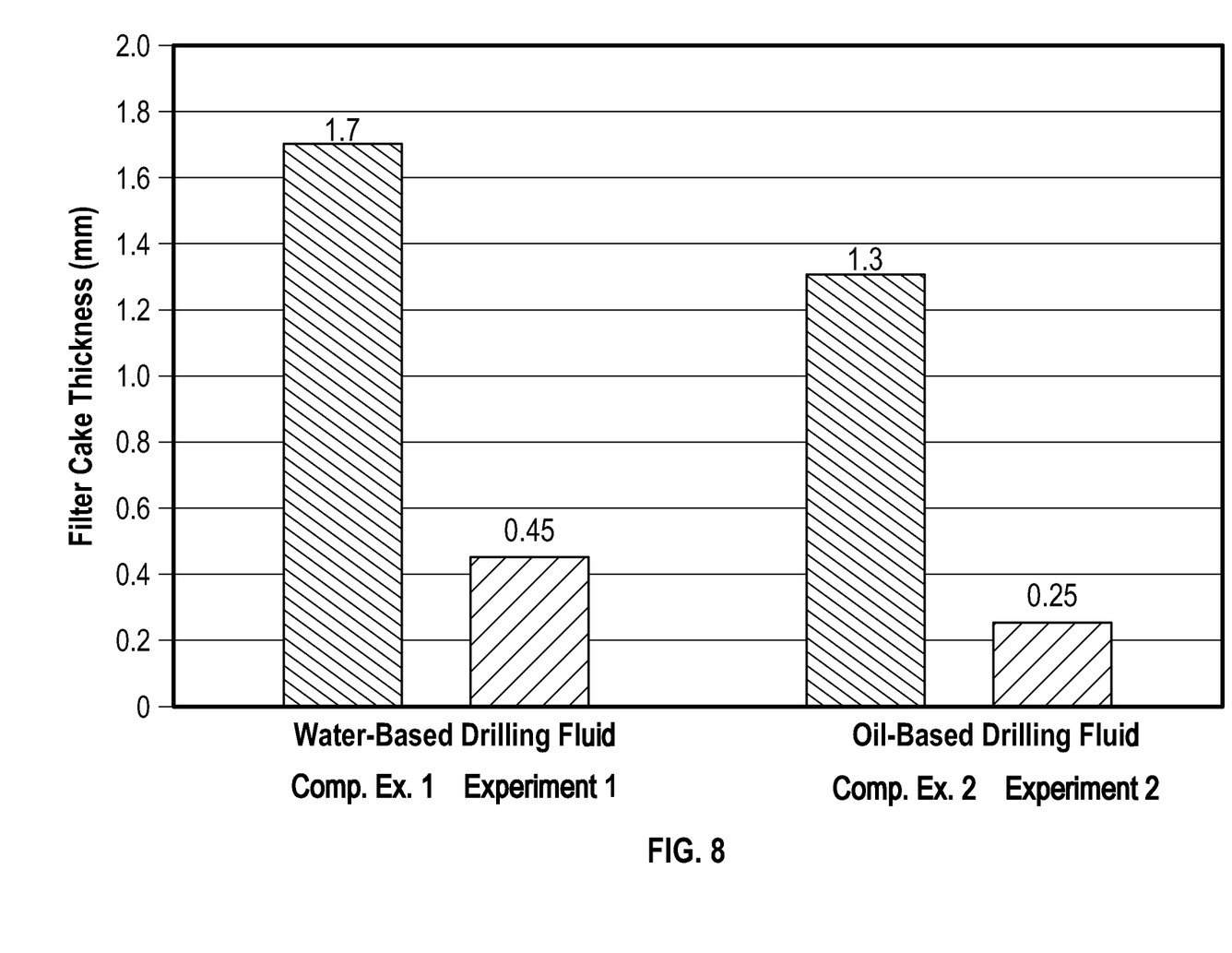
FIG. 8 is a bar graph showing the filter cake thickness formed from Experiments 1 and 2 and Comparative Examples 1 and 2 according to one or more embodiments.

The filter cake formed using the formulations of water-based and oil-based drilling fluids with and without encapsulated thermochemicals are shown in FIG. 8. The removal efficiency in the case of water-based drilling fluid was 70% by taking the weight difference between the original weight and final weight of the filter cake. The original weight means the weight of the filter cake with old drilling formulations and the final weight means the weight of the drilling fluids with the thermochemical formulation. This confirmed that the encapsulated thermochemicals were an integral part of the filter cake. Once the thermochemical reaction took place, the generated pressure and temperature disturbed the filter cake and removed the majority of the solids from the surface to become part of the bulk drilling fluid. In field operations, the efficiency is expected to be greater because the encapsulated thermochemicals, once reacted, will generate potentially increased pressure that will push back most of the solids remaining from the filter cake.

The removal efficiency of the oil-based formulation of Experiment 2 was 85%. In field conditions, this efficiency is expected to be potentially greater because of the generated pressure and temperature from the encapsulated thermochemicals that invaded the formation.

The thickness of the filter cake formed with the water- and oil-based drilling fluids formulations were measured. The thickness of filter cake formed on a ceramic disk with water-based drilling fluid of Comparative Experiment 1 was 0.45 mm. The thickness of filter cake formed on a ceramic disk with water-based drilling fluid of Experiment 1 was 1.7 mm. The thickness of filter cake formed on a ceramic disk with oil-based drilling fluid of Experiment 2 was 0.25 mm. The thickness of filter cake formed on a ceramic disk with oil-based drilling fluid of Comparative Example 2 was 1.3 mm.

Example 5—Thermochemical Stability Experiments

Figure 9:
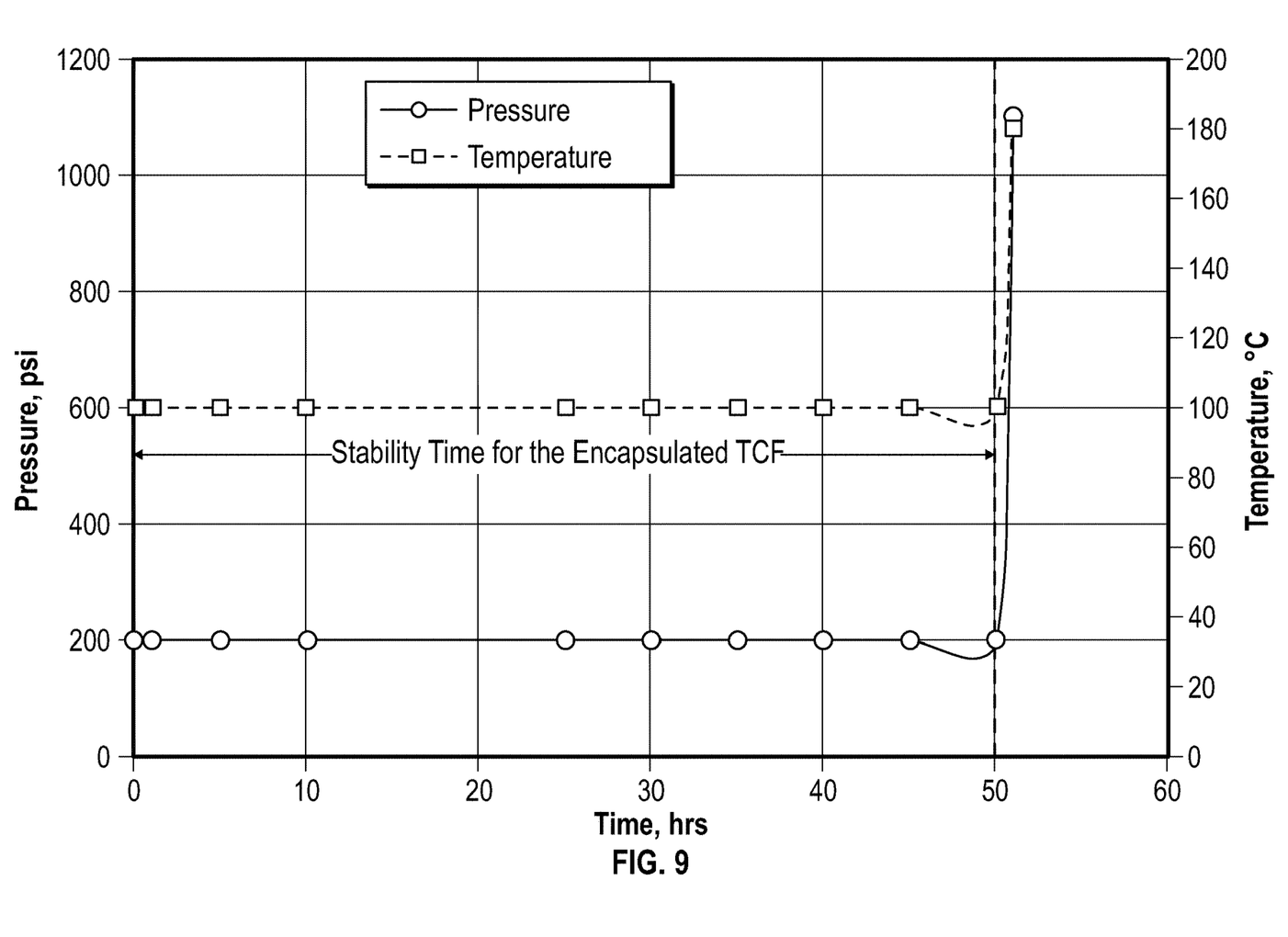
FIG. 9 shows the graphs of pressure and temperature of encapsulated and non-encapsulated thermochemicals in function of time of Example 5 according to one or more embodiments.

FIG. 9 shows the time stability of encapsulated thermochemicals and the generation of pressure and temperature due to the exothermic reaction generated from the thermochemical reaction shown in Equation (1). The time stability of the encapsulated thermochemicals was 48 hours. It is noted that in drilling operations, at least 48 hours are usually needed for the trip in and trip out before moving into cementing operations. After 48 hours, the strongly exothermic reaction initiated, and thermochemical fluids reacted. Upon reaction, the pressure increased from 200 psi to 1100 psi. The temperature increased from 100° C. to 180° C. The microcapsules encapsulating the thermochemicals were stable almost for 2 days.

Figure 10:
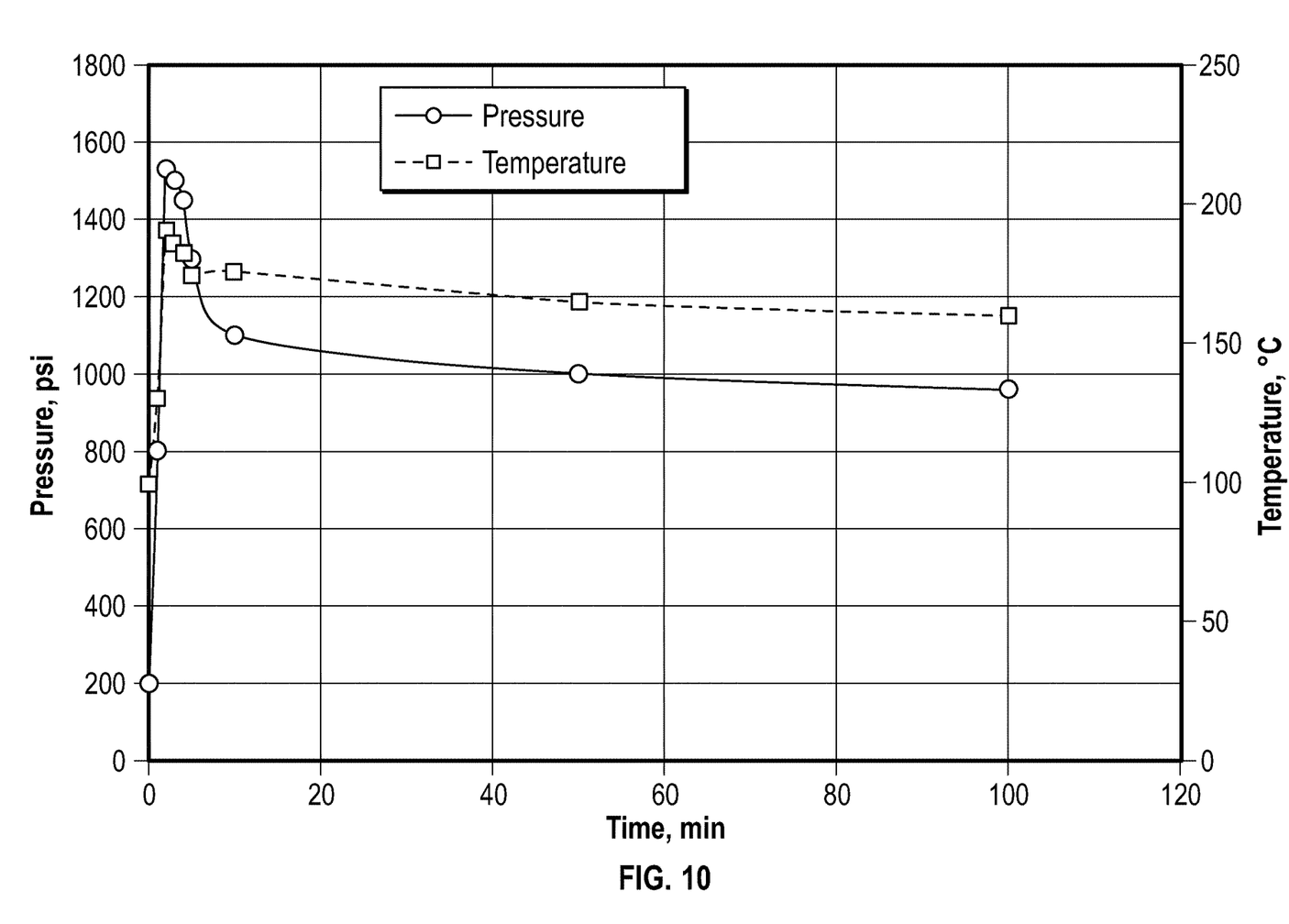
FIG. 10 shows the graphs of pressure and temperature of encapsulated and non-encapsulated thermochemicals in function of time of Example 5 according to one or more embodiments.

In comparison, FIG. 10 shows the pressure and temperature generated from the same thermochemicals that are non-encapsulated. In this comparative example, the temperature of the reactor was 100° C., and the reaction took place in less than 2 min compared to the 2 days for the encapsulated thermochemicals. The generated pressure and temperature are comparable with those obtained in the case of encapsulated thermochemicals. The kinetics of the thermochemical reaction were examined in a micro-reactor system. The reaction kinetics parameters were determined to produce the thermal energy required to dissolve filter cake formed with water and oil-based drilling fluids. The thermochemical reaction was triggered by preheating a micro-reactor system to 100° C. The molar ratio of reactants was 1:1.

One of the major challenges that operators face when using conventional methods of hydrocarbon recovery of tight and high stress reservoirs includes hydrocarbon losses resulting from high breakdown pressures exceeding pumping limitation or completion rating. Advantageously, the oil-based and water-based drilling fluids formulations including encapsulated thermochemicals of this disclosure resulted in the self-destruction of filter cake formed with oil-based and water-based drilling fluids. In addition, the thickness of filter cake obtained using the present formulations may be much thinner, as measured at 0.6 mm and 0.5 mm, than filter cake formed in conventional operations, as measured at 1.7 mm and 1.3 mm, respectively, in the corresponding Examples.

While only a limited number of embodiments have been described, those skilled in the art having benefit of this disclosure will appreciate that other embodiments can be devised which do not depart from the scope of the disclosure.

Although the preceding description has been described here with reference to particular means, materials and embodiments, it is not intended to be limited to the particulars disclosed here; rather, it extends to all functionally equivalent structures, methods and uses, such as those within the scope of the appended claims.

The presently disclosed methods and compositions may suitably comprise, consist or consist essentially of the elements disclosed and may be practiced in the absence of an element not disclosed. For example, those skilled in the art can recognize that certain steps can be combined into a single step.

Unless defined otherwise, all technical and scientific terms used have the same meaning as commonly understood by one of ordinary skill in the art to which these systems, apparatuses, methods, processes, and compositions belong.

The ranges of this disclosure may be expressed in the disclosure as from about one particular value, to about another particular value, or both. When such a range is expressed, it is to be understood that another embodiment is from the one particular value to the other particular value, or both, along with all combinations within this range.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

The terms substantial, "substantially", and all grammatical variations thereof as used refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A drilling fluid composition comprising:
   a weighting agent;
   nitrite-containing copolymer microparticles comprising a nitrate-containing compound and a copolymer, where the copolymer encapsulates the nitrite-containing compound forming the nitrate-containing copolymer microparticles; and
   ammonium-containing copolymer microparticles comprising an ammonium-containing compound and the copolymer, where the copolymer encapsulates the ammonium-containing compound forming the ammonium-containing copolymer microparticles;
   where the copolymer is a combination of esters and acids,
   wherein the copolymer is comprised of a uniformly sized microporous tubular membrane having a plurality of micropores, and
   where a density of the drilling fluid composition is substantially similar to a density of a comparable composition devoid of the nitrite-containing copolymer microparticles and the ammonium-containing copolymer microparticles, where the comparable composition is a drilling fluid.

2. The drilling fluid of claim 1, where the weighting agent is barium sulfate.

3. The drilling fluid of claim 2, where the barium sulfate comprises barium sulfate particles having a size in a range of about 40 microns to about 60 microns.

4. The drilling fluid of claim 1, where the nitrite-containing compound is sodium nitrite.

5. The drilling fluid of claim 1, where the ammonium-containing compound is ammonium chloride.

6. The drilling fluid of claim 1, where the ammonium-containing compound is ammonium sulfate.

7. The drilling fluid of claim 1, where the drilling fluid composition is a water-based drilling fluid.

8. The drilling fluid of claim 1, where the drilling fluid composition is an oil-based drilling fluid.

9. The drilling fluid of claim 1, further comprising one or more emulsifiers.

10. The drilling fluid of claim 1, where the nitrite-containing copolymer microparticles and ammonium-containing copolymer microparticles have a size in a range of about 25 to about 50 microns.

11. The drilling fluid of claim 1, where the nitrite-containing compound and the ammonium-containing compound are present in the drilling fluid in a combined amount of about 1 wt % to about 15 wt % based on the total weight of the drilling fluid.

12. The drilling fluid of claim 1, wherein the plurality of micropores have an average diameter of from about 0.1 μm to about 30 μm.

* * * * *